United States Patent [19]

Awalt, Jr.

[11] Patent Number: 5,002,002
[45] Date of Patent: Mar. 26, 1991

[54] METHOD FOR SECURING ANCHORS

[75] Inventor: Thomas Y. Awalt, Jr., Pensacola, Fla.

[73] Assignee: Deep Seven Co., Pensacola, Fla.

[21] Appl. No.: 581,070

[22] Filed: Sep. 10, 1990

Related U.S. Application Data

[63] Continuation-in-part of Ser. No. 333,720, Apr. 5, 1989, abandoned, which is a continuation of Ser. No. 159,910, Feb. 24, 1988, abandoned, which is a continuation-in-part of Ser. No. 914,983, Oct. 3, 1986, Pat. No. 4,750,445.

[51] Int. Cl.⁵ ............................................. B63B 21/22
[52] U.S. Cl. ..................................... 114/210; 24/68 T
[58] Field of Search ................. 114/109, 210, 215–217; 254/256, 257; 24/68 CT, 68 CD, 69 WT, 70 CT, 71 CT; 119/110

[56] References Cited

U.S. PATENT DOCUMENTS

| | | | |
|---|---|---|---|
| 6,509 | 6/1849 | Perley | 114/210 |
| 257,263 | 5/1882 | Wood | 24/71 TD |
| 1,230,146 | 6/1917 | Frieze | 24/68 CT |
| 2,919,895 | 1/1960 | Johnson | 24/68 CD |
| 2,998,272 | 8/1961 | Newcomer, Jr. et al. | 24/68 T |

Primary Examiner—Ed Swinehart

[57] ABSTRACT

A device for tensioning and locking an attachable subject which includes, in combination, a toggle clamp and a quick release pin channel lock. The channel lock provides a method for securing an anchor on a bow roller.

1 Claim, 2 Drawing Sheets

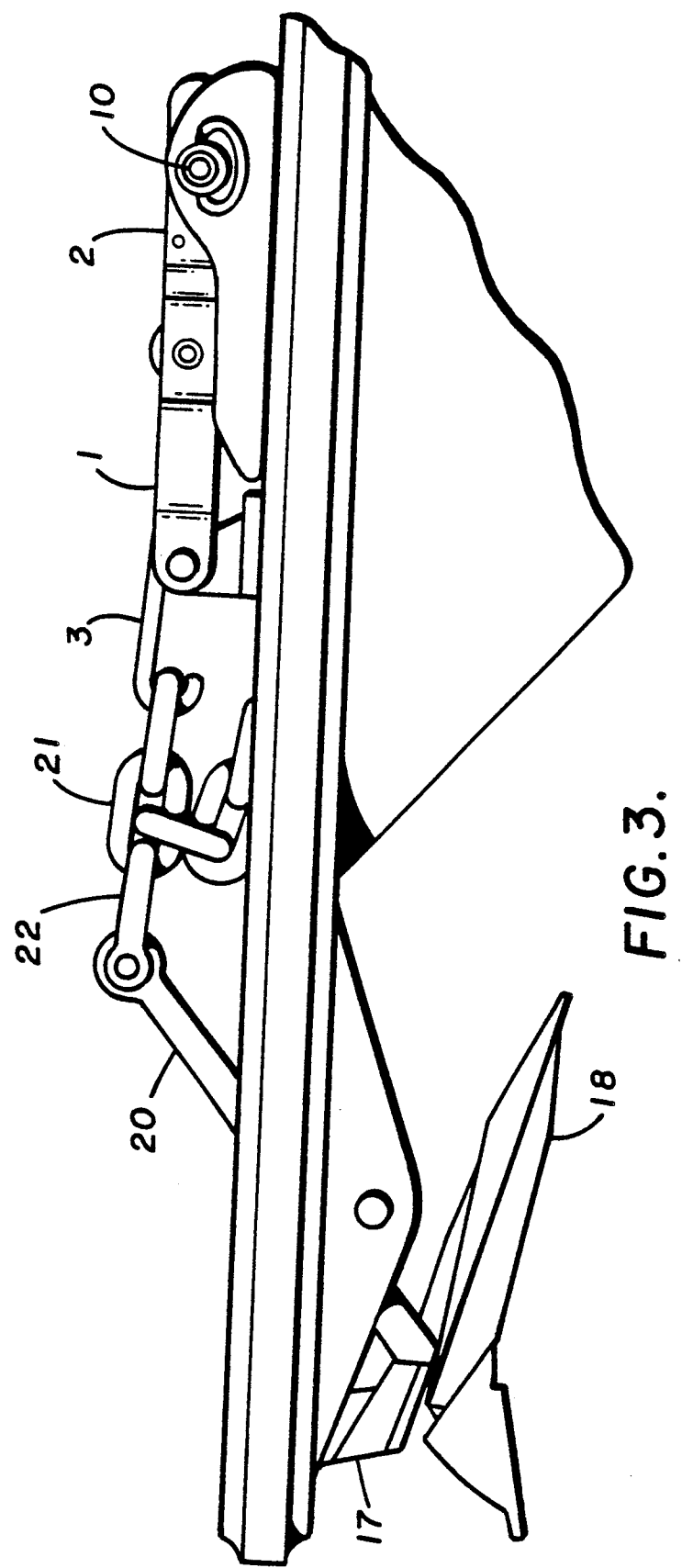

METHOD FOR SECURING ANCHORS

This application is a continuation in part application of Application Ser. No. 07/333720, filed Apr. 5, 1989 now abandoned, which was a continuation of application Ser. No. 07/159910, filed Feb. 24, 1988 now abandoned, which was a continuation-in-part of application Ser. No. 914983, filed Oct. 3, 1986, now U.S. Pat. No. 4,750,445.

BACKGROUND OF THE INVENTION

A. Field of the Invention

The invention relates to toggle clamps and locks therefore, and the use of said toggle clamps and locks for securing an anchor on the bow of a boat when the head of the shank of the anchor is resting on a roller, pin, channel or other apparatus and the flukes, plough or other digging portions are over-lapping the roller, pin or channel.

B. The Prior Art

Toggle clamps are well known in the art of clamping objects against fixed position holders. The toggle clamp, by its very nature, provides a lock of sorts when it is in the retracted position. Most toggle clamps are subject to release by accidental tripping, vibration, or other external forces. It would be an advance in the art if toggle clamps were provided with safe locks, so that an object being held by a toggle clamp could be placed in the locked position with the quick and easy movement of a toggle clamp; and then, without releasing the tension therein provided, be subsequently safe locked with a fail safe pin.

Most intermediate sized boats in the 25–65 foot range have some accommodation for one or more anchors at the ready on the bow. An "anchor at the ready" as used herein is an anchor which can be released from the bow through a chute, over a roller or with other state-of-the-art apparatus.

Attached to most of these anchors is one or more shackles and a length of chain comprising the anchor rode, but also furnishing convenient linkages for holding the anchor in place on the bow. While there are some elaborate systems for holding the anchor in place with winch gypsies, windlass gypsies and/or chain pawl locks, except for the chain pawl locks, most of these devices cannot be relied upon to prevent accidental release. Many less sophisticated systems require that the anchor be lashed with line or hooked with elastic (Bungie) cord on the bow to prevent accidental release. Lashings or elastic retainers are imperfect and susceptible to accidental release; and they are sometimes slow to make fast and release.

An object of this invention is to provide the easy clamping action of a toggle clamp in combination with a fail-safe locking means, in such a manner that once a clamp has been tensioned, there is no need to release the clamp prior to the fail safe locking step.

Still a further object of this invention is to provide a means for quickly securing an anchor at the ready on the bow of a boat, and then, without releasing the tensioning means, lock the tensioning means with a fail-safe secure lock.

Briefly, the objects of this invention are accomplished in a device comprising in combination a toggle clamp having an attachment arm, a handle and mounting means, and having an open position and a closed position; and a quick release pin channel lock comprising an elongated channel having an essentially planar base and two essentially planar sides, each of said sides having at least one circular orifice, defined by rotation of a radius on an axis, the axis of rotation for each orifice being essentially the same, mounting means for the channel and a removable locking pin insertable in the circular orifices to provide a locked status. The channel lock being mountable so that when the toggle clamp is in the closed position, the handle of the toggle clamp is generally along the center line of the channel and at least partially below the removable locking pin when in a locked status.

BRIEF DESCRIPTION OF THE DRAWINGS

FIG. 3 is a side view showing an anchor secured at the ready on the bow of a boat in accordance with this invention.

DETAILED DESCRIPTION OF THE PREFERRED EMBODIMENT

Figure 1:
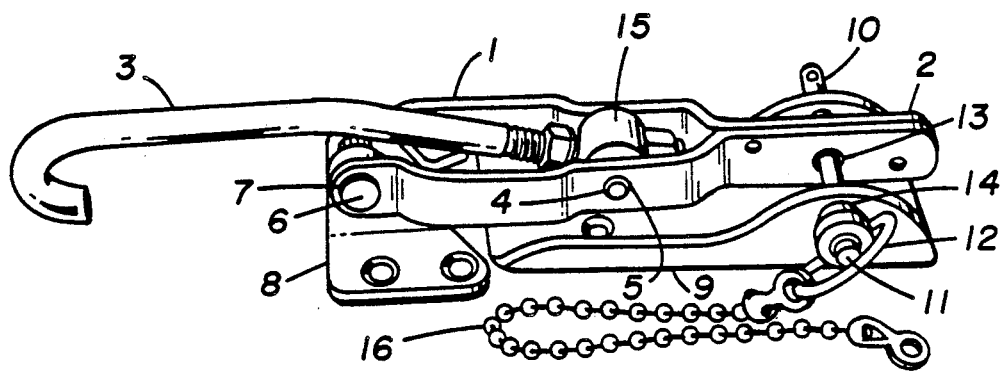
FIG. 1 is a perspective of a preferred embodiment of this invention in which the quick release pin is a push button ball type quick release pin.

Referring now to FIG. 1, toggle clamp 1, comprises toggle handle 2 and toggle attachment arm 3, the latter being bolted to spacer 15. Spacer 15 is hingedly secured to toggle handle 2 by toggle attachment arm pin 4 through toggle arm orifice 5. Toggle handle 2 is hingedly attached to toggle base 8 by means of toggle handle pin 6 through toggle base orifice 7. When toggle clamp 1 is in the retracted position shown, toggle handle 2 can be safe-locked with quick release locking pin 10. In the preferred embodiment shown at FIG. 1, quick release pin 10 can be inserted through quick release pin channel orifice 14 and quick release handle orifice 13. Lanyard 14 can be used to prevent the loss of pin 10 when handle 2 is unlocked. Lanyard 14, as shown in FIG. 1 is attached to pin handle 12.

Figure 2:
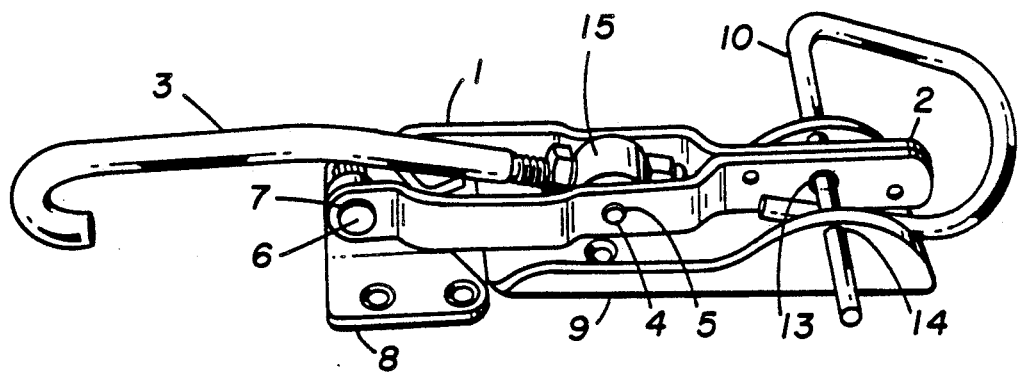
FIG. 2 is a perspective of a second preferred embodiment of this invention in which the quick release pin is a tortion arm clip pin.

Referring now in detail to FIG. 2, all elements are the same as the embodiment shown in FIG. 1 except that a different quick release pin 10 is shown.

Referring now in detail to FIG. 3, anchor 17 with flukes 18, and shank 20 is connected to chain 21 by shackle 22. Chain 21 is engaged and placed under tension in place by attachment arm 3 of toggle clamp 1, handle 2 of which is locked in place by quick release pin 10.

In operation, the retractable object i.e. the anchor is engaged directly, or through any convenient linkages, by toggle attachment arm 3, and toggle handle 2 is pulled back and downwardly into quick release locking channel 9. Handle 2 can then be locked by inserting locking pin 10 through channel orifices 14 and over toggle handle 2 or through orifice 13 in toggle handle 2.

By definition, toggle clamps have a past-dead-center locking position, but the position of the toggle with respect to dead center depends in large part upon the direction of pull. Referring to FIG. 1, it is inherent in the device shown that if attachment arm 3 of toggle clamp 1 is essentially horizontal with the clamp in the closed retracted position, the toggle will be past dead center. However, on a pull at 10° or 15° above the horizontal the toggle will be short of rather than past dead center. So the toggle clamp inherently may or may not be installed so as to utilize the past-dead-center position.

Since the toggle clamp of this invention has a supplemental lock, there is, of course, no inherent operational requirement that the toggle be in the past-dead-center position when the device is in the closed retracted position. However it is inherently at or near the dead center position—on either side of dead center—that the maximum mechanical advantage of the toggle is realized; which advantage, in turn, permits maximum tension with ease of operation. Thus the phrase: "near dead center" is employed herein to indicate a toggle position at or on either side of dead center in which a mechanical advantage of at least about 50% of the maximum useable mechanical advantage is realized.

Wherever it may become desirable to prevent the theft of the object retracted, a padlock can be substituted for quick release pin 10. If a padlock is used, and if toggle handle 2 is secured by running the padlock through orifice 13 of toggle handle 2, it would be impossible to remove the restrianed object by removing the means by which toggle base is secured.

I claim:

1. A method for securing and releasing an anchor at the ready on the bow of a boat by placing the anchor under tension with a device for tensioning and safelocking comprising in combination:
   (a) a toggle clamp having a toggle base, a handle member, and an attachment arm, the handle member having a handle portion and a base end, the base end being hingedly attached to the toggle base, the attachment arm being hingedly attached to the handle member between the handle portion and the base end, thereby forming a toggle joint having a near dead center position, and mounting means for securing the toggle base to a mounting surface, the toggle clamp having an open reach position and an essentially closed retracted clamp position at the near dead center position of the toggle joint towards which closed position the handle portion can be drawn back with a substantial mechanical advantage applied in retracting the attachment arm, and
   (b) means independent of any past-dead center toggle position for engaging, and thereby holding as against a lifting force and for disengaging and thereby releasing the handle member in and from the essentially closed retracted clamp position, the method comprising:
   (a) mounting the toggle clamp with the engaging means in juxtaposition with the anchor so that the attachment arm of the toggle clamp can be attached to the anchor when in the open reach position and tension the anchor when in the closed retracted clamp position;
   (b) manually attaching the anchor to the attachment arm of the toggle clamp while in the open reach position;
   (c) moving the handle member of the toggle clamp into the essentially closed retracted clamp position;
   (d) engaging the engaging means for the handle member of the toggle clamp, thereby securing the anchor; and
   (e) disengaging the engaging means for the handle member, moving the handle of the toggle clamp out of the essentially closed retracted clamp position and manually disengaging the toggle clamp attachment arm from the anchor, thereby to release the anchor.

* * * * *